(12) United States Patent
Han et al.

(10) Patent No.: US 9,019,426 B2
(45) Date of Patent: Apr. 28, 2015

(54) METHOD OF GENERATING IMAGE DATA BY AN IMAGE DEVICE INCLUDING A PLURALITY OF LENSES AND APPARATUS FOR GENERATING IMAGE DATA

(75) Inventors: Hee-chul Han, Hwaseong-si (KR); Yang-lim Choi, Seongnam-si (KR); Seung-ki Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 688 days.

(21) Appl. No.: 12/822,711

(22) Filed: Jun. 24, 2010

(65) Prior Publication Data

US 2011/0157387 A1 Jun. 30, 2011

(30) Foreign Application Priority Data

Dec. 30, 2009 (KR) ........................ 10-2009-0134917

(51) Int. Cl.
*H04N 5/238* (2006.01)
*G03B 13/00* (2006.01)
*H04N 5/232* (2006.01)
*H04N 5/228* (2006.01)
*G02B 7/28* (2006.01)
*G03B 7/099* (2014.01)
*G02B 26/00* (2006.01)
*H04N 5/225* (2006.01)

(52) U.S. Cl.
CPC ............. *H04N 5/232* (2013.01); *H04N 5/2253* (2013.01); *H04N 5/2254* (2013.01); *H04N 5/2258* (2013.01)

(58) Field of Classification Search
CPC .............................. H04N 1/306; H04N 5/2254
USPC ............ 348/42–60, 22.1, 229.1, 240.99, 345, 348/335, 369, 222.1; 396/72–75, 91, 92, 396/348–350, 341–347
See application file for complete search history.

(56) References Cited

U.S. PATENT DOCUMENTS

| | | | | |
|---|---|---|---|---|
| 5,003,385 A * | 3/1991 | Sudo | | 348/49 |
| 5,142,357 A * | 8/1992 | Lipton et al. | | 348/48 |
| 5,499,051 A * | 3/1996 | Suda et al. | | 348/218.1 |
| 5,760,963 A * | 6/1998 | Mori | | 359/622 |
| 5,903,303 A * | 5/1999 | Fukushima et al. | | 348/47 |
| 5,907,434 A * | 5/1999 | Sekine et al. | | 359/462 |
| 6,450,648 B1 * | 9/2002 | Ohzawa et al. | | 353/70 |
| 6,507,374 B1 * | 1/2003 | Miyatake et al. | | 348/745 |
| 6,809,771 B1 * | 10/2004 | Hamaguchi et al. | | 348/335 |
| 7,190,389 B1 * | 3/2007 | Abe et al. | | 348/42 |
| 7,277,118 B2 * | 10/2007 | Foote | | 348/36 |
| 7,397,511 B2 * | 7/2008 | Ezawa | | 348/373 |
| 7,593,036 B2 * | 9/2009 | Shiraki | | 348/207.2 |
| 2003/0019932 A1 * | 1/2003 | Tsikos et al. | | 235/454 |
| 2003/0071123 A1 * | 4/2003 | Tsikos et al. | | 235/454 |
| 2003/0071128 A1 * | 4/2003 | Tsikos et al. | | 235/470 |
| 2004/0125459 A1 * | 7/2004 | Tanitsu et al. | | 359/619 |
| 2006/0187310 A1 * | 8/2006 | Janson et al. | | 348/218.1 |
| 2006/0257042 A1 | 11/2006 | Ofek et al. | | |
| 2007/0031062 A1 | 2/2007 | Pal et al. | | |
| 2007/0047072 A1 * | 3/2007 | Zimmer | | 359/377 |

(Continued)

*Primary Examiner* — Chia-Wei A Chen
(74) *Attorney, Agent, or Firm* — Sughrue Mion, PLLC

(57) ABSTRACT

A method for generating image data includes adjusting an angle formed by each of a plurality of lenses attached to the imaging device relative to a reference plane based on a photography mode, obtaining at least one first image data using the plurality of adjusted lenses, and generating second image data corresponding to the photography mode using the at least one first image data.

10 Claims, 8 Drawing Sheets

(56) References Cited

U.S. PATENT DOCUMENTS

| | | | |
|---|---|---|---|
| 2007/0263293 A1* | 11/2007 | Batchko et al. | 359/666 |
| 2008/0024596 A1* | 1/2008 | Li et al. | 348/47 |
| 2008/0024614 A1* | 1/2008 | Li et al. | 348/207.99 |
| 2008/0080773 A1* | 4/2008 | Brady et al. | 382/210 |
| 2008/0131019 A1 | 6/2008 | Ng | |
| 2008/0239064 A1* | 10/2008 | Iwasaki | 348/47 |
| 2008/0304082 A1* | 12/2008 | Gotz et al. | 356/614 |
| 2009/0110285 A1 | 4/2009 | Elad et al. | |
| 2009/0237783 A1* | 9/2009 | Kim et al. | 359/407 |
| 2010/0079602 A1* | 4/2010 | Napper et al. | 348/208.1 |
| 2010/0097443 A1* | 4/2010 | Lablans | 348/36 |
| 2010/0097444 A1* | 4/2010 | Lablans | 348/46 |
| 2010/0157439 A1* | 6/2010 | Luo | 359/689 |
| 2010/0283833 A1* | 11/2010 | Yeh | 348/46 |
| 2010/0284201 A1* | 11/2010 | Alasaarela et al. | 362/551 |
| 2010/0289941 A1* | 11/2010 | Ito et al. | 348/345 |
| 2010/0309665 A1* | 12/2010 | Young et al. | 362/235 |
| 2011/0031420 A1* | 2/2011 | Gotz et al. | 250/577 |
| 2011/0080487 A1* | 4/2011 | Venkataraman et al. | 348/218.1 |
| 2011/0207986 A1* | 8/2011 | O'Connor et al. | 600/1 |
| 2011/0211077 A1* | 9/2011 | Nayar et al. | 348/207.1 |
| 2011/0268328 A1* | 11/2011 | Bar-Aviv et al. | 382/128 |
| 2014/0171808 A1* | 6/2014 | Greenstein et al. | 600/476 |

* cited by examiner

METHOD OF GENERATING IMAGE DATA BY AN IMAGE DEVICE INCLUDING A PLURALITY OF LENSES AND APPARATUS FOR GENERATING IMAGE DATA

CROSS-REFERENCE TO RELATED PATENT APPLICATION

This application claims the benefit of Korean Patent Application No. 10-2009-0134917, filed on Dec. 30, 2009, in the Korean Intellectual Property Office, the disclosure of which is incorporated herein in its entirety by reference.

BACKGROUND

1. Field

Exemplary embodiments relate to a method and apparatus for generating image data, and more particularly, to a method of generating image data by an imaging device including a plurality of lenses and an imaging device including a plurality of lenses.

2. Description of the Related Art

In image processing technology, it is a main goal and one of the most difficult matters to accurately reproduce a scene seen by a person's visual system using an image output apparatus. This is because a scene seen by person's eyes has a very wide dynamic range of luminance, while a camera cannot express the entire dynamic range of luminance.

When capturing an image of an object using a camera by mistakenly setting an exposure time or under abnormal illumination, a different scene from a scene seen by a person's visual system may be captured.

In particular, a variety of lenses or a highly efficient lens should be employed in order to obtain an image having a desired effect. This may lead to an increase in the price of cameras.

SUMMARY

According to an aspect of an exemplary embodiment, there is provided a method of generating image data using an imaging device. The method includes: adjusting an angle formed by each of a plurality of lenses attached to the imaging device relative to a reference plane based on a photography mode; obtaining at least one first image data using the plurality of adjusted lenses; and generating second image data corresponding to the photography mode using the at least one first image data.

When the photography mode is a zoom mode, the adjustment of the angle may include adjusting the angle formed by at least one of the plurality of lenses relative to the reference plane such that the at least one of the plurality of lenses is angled toward a central lens disposed in a center of the plurality of lenses.

When the photography mode is a wide-angle mode, the adjustment of the angle may include adjusting the angle formed by at least one of the plurality of lenses relative to the reference plane such that the at least one of the plurality of lenses is angled in a direction away from a central lens disposed in a center of the plurality of lenses.

The generation of the second image data may include: extracting a first patch and a plurality of second patches from the first image data when the photography mode is a zoom mode, the first patch including pixels disposed within a critical range from a target pixel, the second patches including pixels disposed within a critical range from neighboring pixels which neighbor the target pixel; determining weights of the neighboring pixels based on a similarity between the first patch and the second patches; and blending pixel values of the neighboring pixels based on the weights to determine a pixel value of the second image data corresponding to the target pixel.

The generation of the second image data may include: extracting a detail component from the first image data; scaling the detail component; and compensating a detail component of the second image data using the scaled detail component of the first image data.

The generation of the second image data may include: extracting features included in the first image data when the photography mode is a zoom mode; comparing the features to determine a pair of matched first image data; and connecting the pair of matched first image data to generate the second image data.

The obtaining of the at least one first image data may include varying an exposure time of each of the lenses to obtain a plurality of first image data when the photography mode is a light-quantity adjustment mode. The generation of the second image data may include blending the plurality of first image data.

The generation of the second image data may include: dividing at least one original image of the first image data into a base layer, a detail layer, and a color layer using an interface preservation planarization filter when the photography mode is a light-quantity adjustment mode; removing an image distortion component from each of the base layer, the detail layer, and the color layer; and combining the base layer, the detail layer, and the color layer from which the image distortion components are removed to generate the second image data.

The removal of the image distortion component may include: increasing a magnitude of a detail component when a luminance component of the original image exceeds a critical value; and reducing the magnitude of the detail component when the luminance component of the original image is below the critical value.

The generation of the second image data may include: aligning the at least one image data based on an object to be focused when the photography mode is an out-focusing mode; and blending the at least one aligned first image data based on weights of the at least one aligned first image data.

According to an aspect of another exemplary embodiment, there is provided an image data generation apparatus including: a lens array including a plurality of lenses attached to a surface of an imaging device; an angle adjustment unit which adjusts an angle formed by each of the plurality of lenses relative to a reference plane according to a photography mode; a first obtaining unit which obtains at least one image data using the plurality of adjusted lenses; and a second obtaining unit which generates second image data corresponding to the photography mode using the at least one first image data.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

Figure 1:
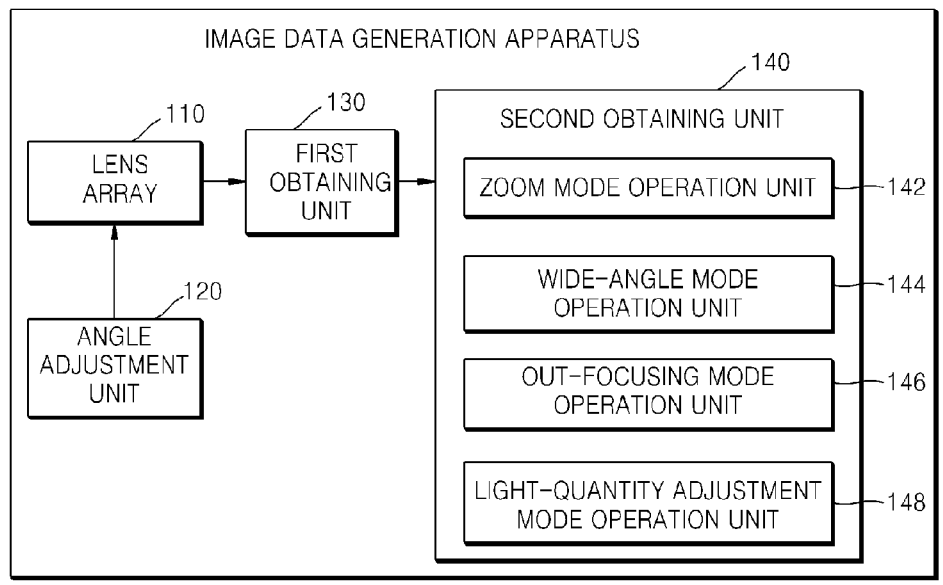
FIG. 1 is a block diagram of an image data generation apparatus according to an exemplary embodiment.

FIG. 1 is a block diagram of an image data generation apparatus 100 according to an exemplary embodiment.

The image data generation apparatus 100 may include a lens array 110 including a plurality of lenses, an angle adjustment unit 120, a first obtaining unit 130, and a second obtaining unit 140.

The plurality of lenses included in the lens array 110 may be attached to the surface of the image data generation apparatus 100. The image data generation apparatus may further include a sensor array 111 including a plurality of sensors corresponding to each of the respective lenses.

Figure 2:
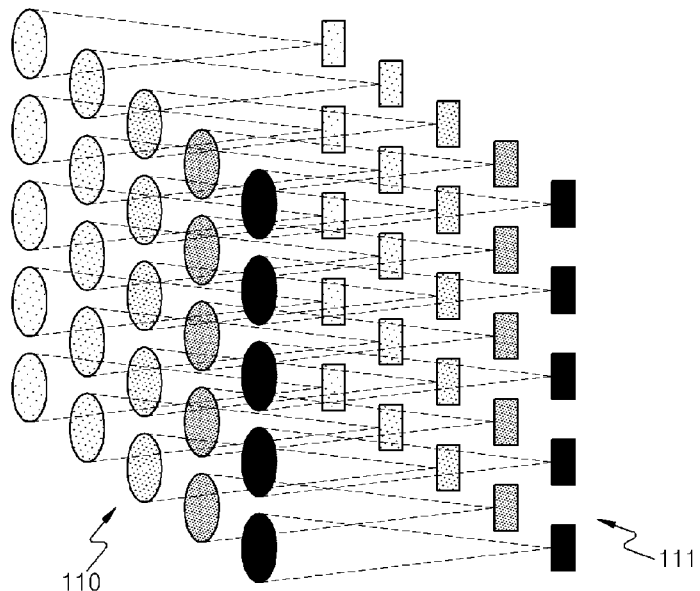
FIG. 2 is a diagram of an image data generation apparatus having a plurality of lenses are attached to a surface thereof, according to an exemplary embodiment.

Angles formed by the plurality of lenses with a reference plane may be adjusted under the control of the angle adjustment unit 120 that will be described later. FIG. 2 is a diagram of an image data generation apparatus 100 having a plurality of lenses are attached to a surface thereof, according to an exemplary embodiment.

The angle adjustment unit 120 may adjust an angle formed by each of a plurality of lenses 110 with a reference plane according to a photography mode. In the exemplary embodiments, it is assumed that the image data generation apparatus 100 is set to face toward an object. Assuming that the surface of the image data generation apparatus 100 is a plane, the surface of the image data generation apparatus 100 may be a reference plane. The photography mode may be variously classified according to an effect desired by a user using the image data generation apparatus 100. In the exemplary embodiments, a normal mode, a zoom mode, a wide-angle mode, an out-focusing mode, and a light-quantity adjustment mode will be described as examples of the photography mode.

The first obtaining unit 130 may obtain at least one first image data using the plurality of adjusted lenses.

The second obtaining unit 140 may generate second image data corresponding to the photography mode using the at least one image data.

Hereinafter, operation of the image data generation apparatus 100 will be described according to the photography mode.

<Normal Mode>

Figure 3:
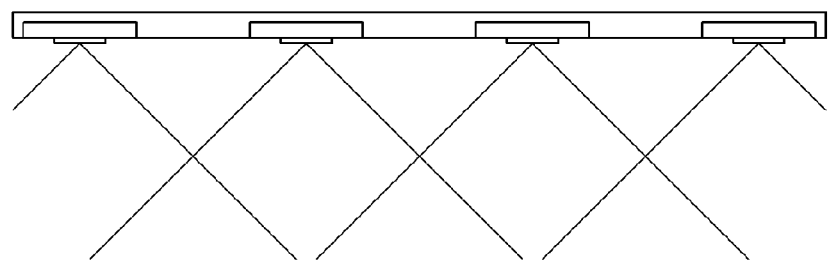
FIG. 3 is a diagram of arrangement of lenses when it is determined that a photography mode is a normal mode, according to an exemplary embodiment.

A normal mode may be used to obtain typical image data through the image data generation apparatus 100. When it is determined that the photography mode is the normal mode, the angle adjustment unit 120 may adjust an angle formed by lenses of the lens array 110 with a reference plane to an angle of 0. FIG. 3 is a diagram of arrangement of the lenses of the lens array 110 when it is determined that the photography mode is the normal mode, according to an exemplary embodiment. Referring to FIG. 3, all the lenses of the lens array 110 may face straight in the normal mode.

<Zoom Mode>

A zoom mode may be used to obtain an enlarged image through the image data generation apparatus 100. A zoom function may be divided into an optical zoom function and a digital zoom function.

In the optical zoom function, the focal length of the lens may be adjusted to change the size of an object in image data. The focal length may refer to a distance between the lens and an image sensor. The optical zoom function will be described in detail with reference to FIG. 6.

Figure 6:
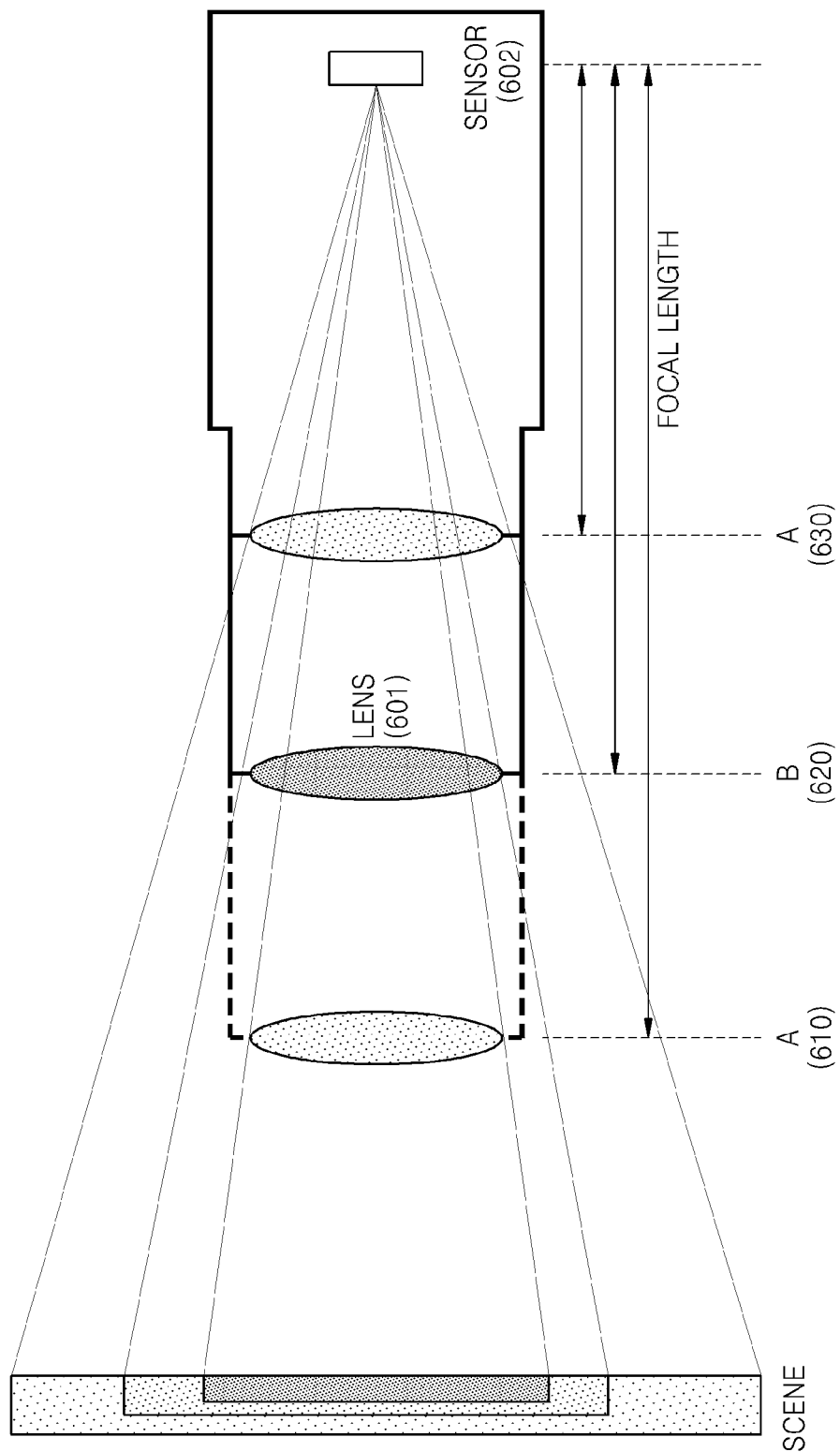
FIG. 6 is a diagram of operation of an optical zoom according to an exemplary embodiment.

When the lens is moved from a position B (620) to a position A (610) as in FIG. 6, the image data in which the size of the object is enlarged may be obtained. That is, when a lens 601 becomes more distant from an image sensor 602, an image of the enlarged object may be converged on the image sensor 602.

When the lens is moved from the B position (620) to a C position (630), image data in which the size of the object is reduced may be converged on the image sensor 602.

In the case of a digital zoom function, the size of an image may be enlarged in a digital manner in order to obtain an artificially closed-up image. In general, an interpolation method may be used to embody a digital zoom. The interpolation method may involve estimating a pixel value between pixels to add a new pixel. However, when a pixel value between pixels cannot be precisely estimated, the quality of an image may be degraded.

In the case of an optical zoom, an expensive lens may be necessarily required to obtain an enlarged image without degrading image quality, thereby increasing the price of a camera. In the case of a digital zoom, when an interpolated pixel value is precisely estimated, an image enlarged to a desired size may be obtained without degrading image quality. However, sufficient information regarding an object may be needed in order to precisely estimate the interpolated pixel value.

Figure 4:
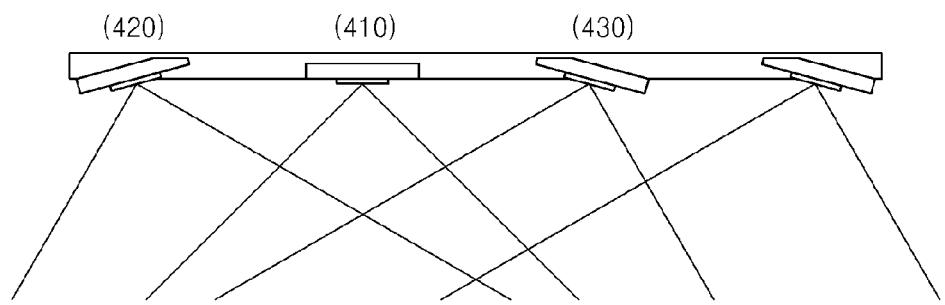
FIG. 4 is a diagram of arrangement of lenses when it is determined that a photography mode is a zoom mode, according to an exemplary embodiment.

When it is determined that the photography mode is a zoom mode, the angle adjustment unit 120 may adjust the inclinations of lenses in order to obtain sufficient information relating to an object. For example, as shown in FIG. 4, the angle adjustment unit 120 may adjust the inclinations of at least one lens, for example, the inclinations of lenses 420 and 430 such that the lenses 420 and 430 face a central lens 410, which is centrally disposed between the lenses 420 and 430. When the inclinations of the lenses 420 and 430 are adjusted, the object may be captured at various angles and information relating to the object may be enriched.

When it is determined that the photography mode is a zoom mode, the zoom mode operation unit 142 may obtain second image data in which an object is enlarged using at least one first image data.

The zoom mode operation unit 142 may embody a virtual telelens using a super-resolution (SR) algorithm in which denoising, deblurring, and scaling are combined. The SR algorithm may refer to a method of generating at least one high-definition image using a plurality of low-definition images.

The SR algorithm may be of various types.

For example, a high-definition image may be generated using a Markov random field and the maximum-a-posteriori (MAP) method. In this method, a cost function most suited to restore the high-definition image should be derived.

As another example, detail of an image may be improved using a Bayesian formula related to a plenoptic camera to generate a high-definition image. In this method, this may be a problem due to a trade-off relationship between a spatial resolution and an angular resolution. In this method, an image forming model may be derived by specifying a point spread function with respect to a scene with a varied depth.

In a sum zooming method, a high-definition image may be obtained using sequential low-definition images obtained at various focal lengths.

Also, an image zooming method may be used by combining a fractal image zooming method, a pattern-based image zooming method, and a nonlocal image denoising method.

The above-described exemplary methods may greatly depend on accurate estimation of motions of an object. However, accurately estimating the motions of the object may be very difficult because noise and aliasing are present in image data. When the motions of the object are not precisely estimated, fatal defects, such as ghost or ringing, may be caused in the resulting image.

In the zoom mode operation unit 142 according to an exemplary embodiment, it is assumed that a high-definition image is obtained using a non-local means (NLM) algorithm. However, the above-described zoom mode operation unit 142 may adopt any method using a plurality of low-definition image data to obtain a high-definition image. The NLM algorithm, which is expressly irrelevant to the estimation of motions, may minimize energy to obtain the high-definition image data.

In the NLM algorithm, the weights of pixels or patches may be defined. A weight of a pixel or patch may refer to the probability that a value of a target pixel (or patch) is equal to a value of its neighboring, or directly adjacent, pixel (or patch). An example of weight according to an exemplary embodiment is expressed in Equation 1:

$$w_{NLM}[k, l, i, j] = \exp\left\{-\frac{\|\hat{R}_{k,l}y - \hat{R}_{i,j}y\|_2^2}{2\sigma_r^2}\right\} \cdot f\left(\sqrt{(k-i)^2 + (l-j)^2}\right). \quad (1)$$

In Equation 1, the weight may be obtained by calculating a geographical distance between coordinates (i,j) of an input pixel and coordinates (k,l) of its neighboring pixel and a Euclidean distance between a patch including the input pixel and a patch including the neighboring pixel. A function "f" may take a geographical distance between the input pixel and the neighboring pixel as an input value and may increase as the geographical distance decrease.

R denotes an operator used to extract a patch from image data. For example, $R_{k,l}y$ is an operator used to extract a patch including pixels disposed in a critical range from the coordinates (k,l) from input image data (y). In this case, input image data is one of a plurality of first image data obtained using a plurality of lenses.

Referring to Equation 1, it can be seen that as similarity between two patches increases, the weight may increase, and as the distance between the two pixels decreases, the weight may increase.

In the NLM algorithm, a MAP probability penalty term may be defined in Equation 2:

$$\epsilon^2(x) = \frac{\lambda}{2} \cdot \|x - y\|_2^2 + \frac{1}{4} \cdot \sum_{(k,l) \in \Omega} \sum_{(i,j) \in N(k,l)} w[k, l, i, j] \cdot \|R_{k,l}x - R_{i,j}x\|_2^2, \quad (2)$$

wherein y denotes input image data, and x denotes output image data. (k,l) denotes the coordinates of an input pixel, and (i,j) denotes the coordinates which neighbor the coordinates (k,l). w[k,l,i,j] denotes a weight. It is estimated that respective patches in the output image are similar to neighboring patches. However, since all pairs of patches are not the same, similarity between the patches may be defined as the weight.

Equation 2 consists of a first term indicating similarity between an input image and an output image and a second term indicating similarity between each patch and other neighboring patches.

A value "x" obtained when a penalty term of Equation 2 is the minimum may be determined as the output image. Thus, the value "x" obtained when the penalty term of Equation 2 is minimum may be calculated by differentiating Equation 2. By calculating the output image, the following Equation 2 may be derived.

$$\hat{x}[k, l] = \frac{\sum_{(i,j) \in N(k,l)} w[k, l, i, j] y[i, j]}{\sum_{(i,j) \in N(k,l)} w[k, l, i, j]}. \quad (3)$$

Referring to Equation 3, it can be seen that x[k,l] in output image data are obtained by calculating the average of pixels included within a critical range from coordinates (k,l) included in first image data based on appropriate weights.

When generating the output image data using a plurality of sequentially generated input image data, a term related to time may be added to change Equation 2. In order to accelerate the calculation, assuming that values x and y have similar gray values, Equation 2 may be changed by adding the term related to time, and thus the following Equation 4 should hold.

$$\eta_T^2(x) = \frac{1}{2} \sum_{(k,l) \in \Omega} \sum_{t \in [1, \ldots, T]} \sum_{(i,j) \in N(k,l)} w[k, l, i, j, t] \cdot \|R_{k,l}x - R_{i,j}y_t\|_2^2. \quad (4)$$

Assuming that X is output image data obtained at a specific viewpoint, since X and $y_t$ are on different scales, Equation 4 should be rearranged. In view of the fact that the output image data X undergoes blurring and decimation, Equation 4 may be rewritten. When a value H, obtained by modelling degradation of image quality caused by blurring, is used as a blurring operator and a value D, obtained by modelling degradation of spatial resolution caused by decimation, is used as a decimation operator, a relationship of x=DHX may be obtained.

Thus, the following Equation 5 may be obtained from Equation 4.

$$\eta_{SR}(X) = \frac{1}{2} \sum_{(k,l) \in \Omega} \sum_{t \in [1,\ldots,T]} \sum_{(i,j) \in N(k,l)} w[k, l, i, j, t] \|R_{k,l} DHX - R_{i,j} y_t\|_2^2 + \lambda TV(X), \quad (5)$$

wherein TV denotes a term obtained by combining an L1 norm for retaining an interface and a gradient norm to softly adjust blurring.

Obtaining high-definition image data based on Equation 5 may be very effective in sub-pixel local motion. However, when a motion value in an image is increased such as in an image sequence obtained from a light-field camera, the efficiency of patch connection may be reduced. In order to solve this problem, it is necessary to add a term compensating a detail component to the penalty term. The following Equation 6 may be obtained from Equation 5 by adding the term compensating the detail component to the penalty term according to an exemplary embodiment.

$$\eta SR(X) = \eta SR(X) + \alpha \times \eta SR(Xd)$$

$$X_d = X - \text{LPF}(X) \quad (6),$$

wherein Xd denotes a detail component of output image, LPF denotes a low-pass filter, and α is a control parameter defined according to blurring. Thus, referring to Equation 6, a penalty term of the detail component of the output image may be appropriately added to a penalty term of the entire output image.

An interface correction filter may be used as the LPF in order to suppress a blurring or ghosting effect. When an input image is processed to generate high-definition image data, detail information regarding the input image may be lost. Thus, only a detail component of the input image may be separately extracted and processed, whereas the detail component in the output image may be perfectly restored.

Figure 9:
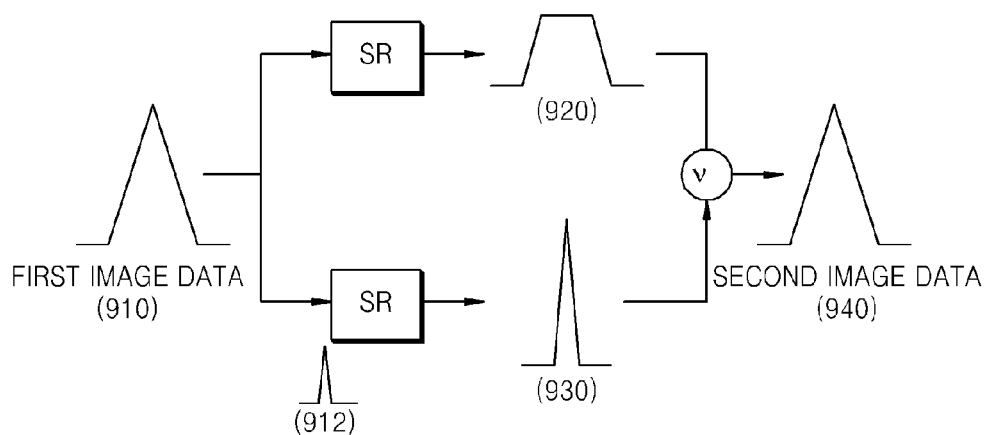
FIG. 9 is a diagram of second image data generated by a zoom mode operation unit according to an exemplary embodiment.

Referring to FIG. 9, initially, the zoom mode operation unit 142 may process low-definition image data 910 using an SR method and generate image data 920. In this case, a detail component 912 may be lost in the image data 920.

Next, the zoom mode operation unit 142 may extract the detail component 912 from the low-definition image data 910. Also, the zoom mode operation unit 142 may process the extracted detail component using the SR method and generate image data 930.

Finally, the zoom mode operation unit 142 may appropriately blend the image data 920 and the image data 930, and generate high-definition image data 940.

In each of Equations 1 through 6, $R_{k,l}x$ was used as a patch. That is, although the patch was extracted from result image data, the patch may be extracted from input image data to accelerate the calculation.

<Wide-Angle Mode>

A wide-angle mode may be used to expand a field of view using the image data generation apparatus 100. That is, a wide-angle function may be used to capture an image of a wider region and regarded as an opposite function to a zoom mode.

As described above, in the case of the optical zoom, the field of view may be extended by reducing the focal length. However, since a lens capable of freely adjusting the focal length is expensive, the price of the image data generation apparatus 100 may be increased. Since the digital zoom includes only image information regarding a captured scene, an image of a wide region should be captured in order to extend the field of view.

Figure 5:
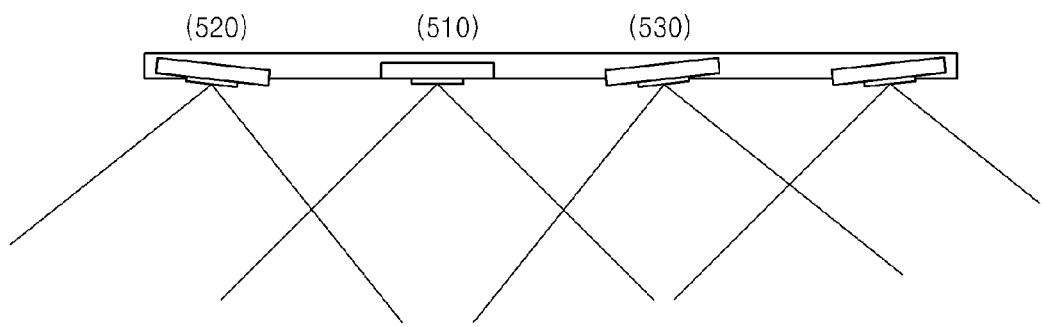
FIG. 5 is a diagram of arrangement of lenses when it is determined that a photography mode is a wide-angle mode, according to an exemplary embodiment.

When it is determined that the photography mode is a wide-angle mode, the angle adjustment unit 120 may adjust the inclinations of the lenses of the lens array 110 so as to capture an image of a wide region. For example, as shown in FIG. 5, the angle adjustment unit 120 may adjust the inclinations of lenses 520 and 530 such that the lenses 520 and 530 may face in a direction away from a central lens 510, which is centrally disposed between the lenses 520 and 530. That is, the central lens 510 may be used to capture an image of a front side of an object, the lenses 520 disposed on the left of the central lens 510 may be used to capture an image of a right side of the object, and the lenses 530 disposed on the right of the central lens 510 may be used to capture an image of a left side of the object, thereby enabling acquirement of information relating to a wide region.

The wide-angle mode operation unit 144 may obtain second image data with an extended field of view using at least one first image data.

Initially, the wide-angle mode operation unit 144 may extract scale invariant feature transform (SIFT) features from each of a plurality of first image data. The SIFT features may refer to invariant features even in a rotation or scaling operation.

The wide-angle mode operation unit 144 may compare the features and extract matched features. The wide-angle mode operation unit 144 may search for the matched features using the following Equation 7:

$$\tilde{U}_i = H_{ij} \tilde{U}_j$$

$$H_{ij} = K_i R_i R_j^T K_j^{-1} \quad (7),$$

wherein $U_i$ and $U_j$ denote matched regions in image data. That is, features which satisfy Equation 7 are determined to be a pair of matched features. R denotes a rotation matrix, and K denotes a value obtained by modelling a camera. As a result, in Equation 7, one feature may be rotated and moved to search for another matched feature.

Next, the wide-angle mode operation unit 144 may select a pair of image data whose features are matched best as a pair of candidate image data and confirm whether the pair of candidate image data is matched.

The wide-angle mode operation unit 144 may adopt a random sample consensus (RANSAC) method in order to confirm whether the pair of candidate image data is matched. In the RANSAC method, geometrically matched features may be found to confirm similarity between the pairs of image data and demonstrate that the pairs of image data are matched using a probability model. The following Equation 8 is used to confirm whether pairs of candidate image data are matched.

$$p(f^{1:n_f} | m=1) = B(n_i; n_f, p_1)$$

$$p(f^{1:n_f} | m=0) = B(n_i; n_f, p_0) \quad (8),$$

wherein $n_f$ denotes the total number of features present in an overlapping region of pairs of candidate image data, and $n_i$ denotes the number of inliers. Here, inliers refer to matched features which are within the group of features present in the overlapping region. p1 denotes probability that features in the pairs of candidate image data are inliers when the pairs of candidate image data are accurately matched. p0 denotes probability that features in the pairs of candidate image data are inliers when the pairs of candidate image data are not matched. B( ) denotes a binomial distribution.

The definition of binomial distribution may be expressed using Equation 9.

$$B(x; n, p) = \frac{n!}{x!(n-x)!} p^x (1-p)^{n-x}. \quad (9)$$

The wide-angle mode operation unit 144 may determine that the pair of candidate image data are matched when p(m=1|f(1:nf))>Pmin is satisfied.

Finally, the wide-angle mode operation unit 144 may connect the pairs of matched image data and generate second image data. The wide-angle mode operation unit 144 may derive the second image data using a multi-band blending algorithm required for intensity correction. The wide-angle mode operation unit 144 may generate the second image data based on the following Equation 10:

$$I_{k\sigma}^{multi}(\theta, \varphi) = \frac{\sum_{i=1}^{n} B_{k\sigma}^i(\theta, \varphi) W_{k\sigma}^i(\theta, \varphi)}{\sum_{i=1}^{n} W_{k\sigma}^i(\theta, \varphi)}, \quad (10)$$

wherein W denotes a weight in a case where wavelength belongs to [0,σ], and B denotes fractional frequency, that is, a part of an input image.

According to other exemplary embodiments, the wide-angle mode operation unit 144 may perform bundle adjustment to solve an error caused by rotation of a camera or a difference in focal length before performing multi-band blending. Alternatively, the wide-angle mode operation unit 144 may perform perspective transformation to compensate projection distortion after performing the multi-band blending.

<Out-Focusing Mode>

An out-focusing mode may be used to obtain out-focused image data using the image data generation apparatus 100. An out-focusing function may refer to a function of focusing only a specific object in image data.

A focused region in the image data may be based on a depth of field. The depth of field may be determined according to a focal length of a lens and an aperture. The aperture may function to control the amount of light and determine a region to be focused. When capturing an image of an object by largely opening the aperture, a bright image may be obtained. Also, only a specific region of image data may be clearly displayed, while the remaining region thereof may be blurred. Conversely, when capturing the image of the object by largely closing the aperture, a relatively dark image may be obtained. Also, the entire region of the image data may be clearly displayed.

Figure 7:
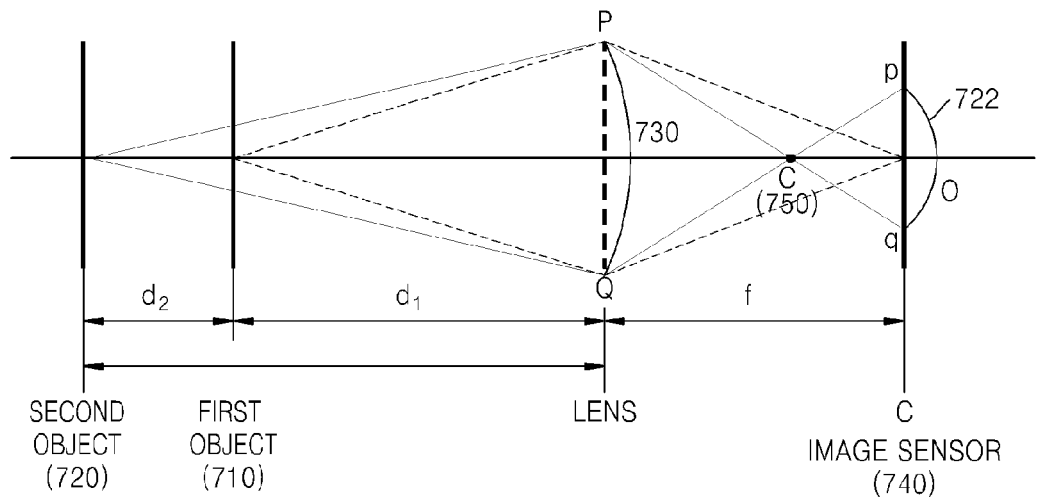
FIG. 7 is a diagram showing a change in focusing position according to an exemplary embodiment.

For example, as shown in FIG. 7, a first object 710 may be positioned at a location spaced a distance of d1 apart from a lens, and a second object 720 may be positioned at a location spaced a distance of d2 apart from the lens. Also, an aperture may be opened by as much as a PQ 730.

When the image data generation apparatus 100 captures an image of a scene, light emitted by a first object 710 may be focused on an image sensor 740. Conversely, light emitted by a second object 720 may be scattered and focused on c 750. Thus, since the light from the second object 720 is scattered in the image sensor 740, the first object 710 may be clearly displayed, while the second object 720 may be blurred. That is, the second object 720 may be blurred by as much as a circle with a diameter of pq 722 as shown in FIG. 7.

Figure 8:
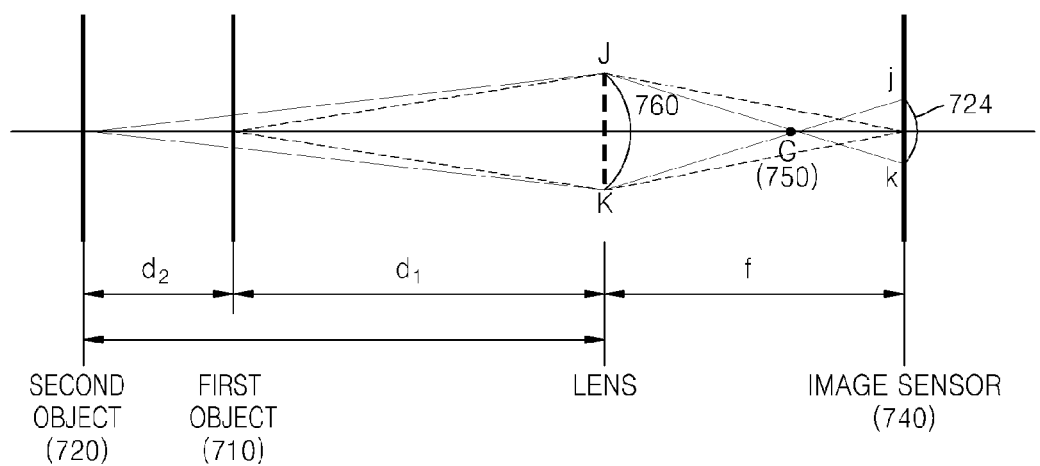
FIG. 8 is a diagram showing a change in focusing position according to another exemplary embodiment.

If the aperture is reduced from PQ 730 to JK 760, as shown in FIG. 8, the blurred region might be reduced from pq 722 to jk 724. As a result, the second object 720 may be displayed more clearly.

The diameter of a blurred region may be obtained using the following Equation 11:

$$r = Rf\left(\frac{1}{d_1} - \frac{1}{d_1 + d_2}\right), \quad (11)$$

wherein R denotes an aperture, f denotes a focal length, d1 denotes a distance between a lens and a focused object, and d2 denotes a distance between the lens and an unfocused object.

Here, f-stop may be defined as a ratio of the aperture R to the focal length f. Thus, the following Equation 12 may be obtained from Equation 11:

$$r = \frac{f^2}{F}\left(\frac{1}{d_1} - \frac{1}{d_1 + d_2}\right), \quad (11)$$

wherein F denotes f-stop.

The intensity of blurring may be controlled by adjusting the focal length or F-stop. However, as the maximum F-stop increases, the price of a lens may increase. Accordingly, a method for embodying out-focused image data using an inexpensive lens is required.

When a person focuses a specific object through left and right eyes, blurring may occur around a specific object. In this case, as an object becomes more distant from the corresponding object, blurring may become more serious. Based on the above principle, the image data generation apparatus 100 may obtain out-focused image data using a plurality of image data obtained by capturing an object at various angles. When the photography mode is an out-focusing mode, the angle adjustment unit 120 may adjust the inclinations of a plurality of lenses of the lens array 110 such that the lenses of the lens array 110 may face a specific object to be focused.

The out-focusing mode operation unit 146 may obtain out-focused second image data using at least one first image data.

To begin with, the out-focusing mode operation unit 146 may align first image data based on the object to be focused.

Next, the first image data may be blended based on weights of the respective first image data.

Figure 10:
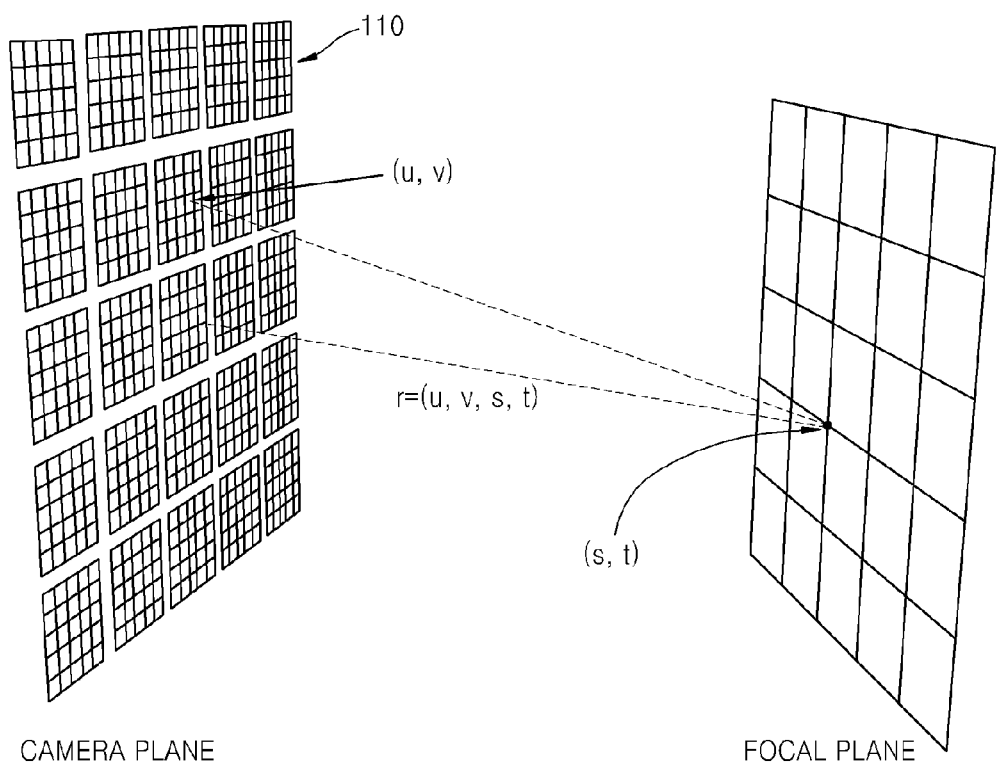
FIG. 10 is a diagram of a light path between a lens array and a focus surface according to an exemplary embodiment.

Hereinafter, operation of the out-focusing mode operation unit 146 will be described with reference to FIG. 10. FIG. 10 is a diagram of a light path between a lens array and a focus surface according to an exemplary embodiment.

Referring to FIG. 10, light departing from one point on a camera plane (u,v) may reach a focal plane (s,t). Each ray "r" may be expressed as a parameter having coordinates (u,v,s,t) of an intersecting point between the focal plane and the camera plane. When first image data are obtained from various viewpoints using the lens array, weights of all rays connecting a same square adjacent to the focal plane (s,t) and the camera plane (u,v) may be determined, and the average of the first image data may be calculated based on the weights. Specifically, the positions of the first image data may be adjusted such that objects to be focused are in the same coordinates.

Afterwards, overlapped first image data may be added based on the weights, thereby obtaining second image data.

The out-focusing mode operation unit 146 may generate second image data based on the following Equation 13.

$$g_n(x) = \sum_{i=0}^{n} \sigma w_i r(s_i, u_i)$$

$$g_n(y) = \sum_{i=0}^{n} \sigma q_i r(t_i, v_i)$$

$$w_i = 1 - \frac{s_c - s_i}{s_{i+1} - s_i}, \quad q_i = 1 - \frac{t_c - t_i}{t_{i+1} - t_i},$$

(13)

wherein n denotes the number of viewpoints, sc and tc denotes center rays, and w and q denote weights.

The out-focusing mode operation unit 146 may change a depth plane to be focused. Thus, only an object positioned on the corresponding depth plane may be clearly seen, while an object that is not positioned on the corresponding depth plane may be blurred in the same way as when captured using a lens with a high iris value. The out-focusing mode operation unit 146 may adjust a value a, which is related to the focal length, to change a virtual iris value.

<Light-Quantity Adjustment Mode>

A light-quantity adjustment mode may be used to control the brightness of image data obtained using the image data generation apparatus 100. An automatic exposure system of a typical imaging device may control an exposure time using shutter speed and an iris value. When an object is captured for a short exposure time, a dark image may be obtained. Conversely, when the object is captured for a long exposure time, a bright image may be obtained. However, it may be hard for a typical user to adjust brightness when required. As a result, by capturing an image of the object in a too small light-quantity state, noise or blurring may occur in the image. Also, when an object is captured in a too large light-quantity state, a detail component may be lost. When the f-stop value of the lens is reduced under the condition of the same f-stop value, performance may be improved, but the price of the lenses may be increased.

The light-quantity adjustment mode operation unit 148 may adopt the following two methods in order to adjust light quantity in an image.

First, an image of an object may be captured by varying an exposure time of each of lenses of the lens array 110. When it is determined that a photography mode is a light-quantity adjustment mode using the first method, the angle adjustment unit 120 may vary an exposure time of each of the lenses and adjust the inclinations of the lenses of the lens array 110 such that the respective lenses of the lens array 110 face straight (or toward a specific object).

The light-quantity adjustment mode operation unit 148 may vary an exposure time and obtain second image data using captured two first image data. There are many bright regions, each of which has a luminance equal to or higher than a critical value, in image data captured by increasing the exposure time. Thus, an object positioned in a space with a large light quantity cannot be precisely discriminated. Conversely, there are many dark regions, each of which has a luminance equal to or lower than the critical value, in image data captured by reducing the exposure time. Thus, an object positioned in a space with a small light quantity cannot be precisely discriminated.

The light-quantity adjustment mode operation unit 148 may obtain information regarding the object positioned in the space with the large light quantity from the image data captured by reducing the exposure time, and obtain information regarding the object positioned in the space with the small light quantity from the image data captured by increasing the exposure time. Thereafter, the obtained information may be combined to generate second image data in which light quantity is appropriately adjusted.

For example, the light-quantity adjustment mode operation unit 148 may give a weight to an image captured by reducing exposure time in a region with a large light quantity, give a weight to an image captured by increasing the exposure time in a region with a small light quantity, and combine a plurality of image data.

Second, a distortion component may be removed from at least one first image data. In order to remove the distortion component, a plurality of first image data obtained using a plurality of lenses of the lens array 110 may be combined to obtain image data from which a distortion component is removed. Alternatively, a distortion component may be removed from one first image data. When it is determined that a photography mode is a light-quantity adjustment mode using the second method, the angle adjustment unit 120 may control only one lens, such as a central lens, to operate or adjust the inclinations of the lenses of the lens array 110 such that each of at least two lenses faces straight (or toward a specific object).

The light-quantity adjustment mode operation unit 148 may divide an input image into a base layer, a detail layer, and a color layer using an interface preservation planarization filter. Equation 14 is a sigma filter, which is a type of interface preservation planarization filter.

$$\sigma = \sqrt{\frac{1}{N} \sum_{i=1}^{N} (l_i(u, v) - \mu)^2}$$

$$l_{(u,v)} = \begin{cases} f(l_1, l_2, \ldots, l_N) & \text{if } |l_{(N+1)/2} - \mu| > k\sigma \\ l_{(N+1)/2} & \text{otherwise} \end{cases},$$

(14)

wherein µ denotes the average of N input data, k denotes a smoothing parameter, and f(•) denotes the average of input sets.

The light-quantity adjustment mode operation unit 148 may remove a distortion component from each of a base layer, a detail layer, and a color layer.

The light-quantity adjustment mode operation unit 148 may process the base layer such that a variation of a luminance dynamic range in a dark region becomes higher than a variation of a luminance dynamic range in a bright region. A person's visual system may increase contrast sensitivity in the dark region so as to discriminate an object even in the dark region. Like the person's visual system, the light-quantity adjustment mode operation unit 148 may allow a dynamic range of a luminance component in the dark region to increase more than a dynamic range of a luminance component in the bright region.

The light-quantity adjustment mode operation unit 148 may process the base layer using the following Equation 15.

$$y = \log(x+1) - \alpha \log(\log(x)+1)$$

(15), wherein x denotes the luminance component of the baser layer.

The light-quantity adjustment mode operation unit 148 may process the detail layer so as to maintain the detail of the bright region and remove noise from the dark region. In general, a detail component and a noise component are combined in the detail layer. In this case, the noise and detail components are greater in the dark region than in the bright region. In other words, the noise component is relatively great in the dark region. In particular, while processing the base layer, the light-quantity adjustment mode operation unit 148 greatly increases the dynamic range of a luminance component in the dark region. The dynamic range of the noise component may be also increased. In order to prevent noise from increasing in the dark region, the light-quantity adjustment mode operation unit 148 may reduce the magnitude of the detail component in the dark region and increase the magnitude of the detail component in the bright region.

The light-quantity adjustment mode operation unit 148 may process the detail layer using the following Equation 16:

$$i(x) = \frac{x_i}{x_s} * p(x_i), \tag{16}$$

wherein i(x) denotes a detail component, x, denotes a luminance component of an original image, and xs denotes a luminance component of the base layer. Also, p(x) denotes an attenuation term.

By dividing the luminance component of the original image by the luminance component of the base layer, the detail component may be obtained. The light-quantity adjustment mode operation unit 148 may divide the luminance component of the original image by the luminance component of the base layer and multiply an obtained value by the interface attenuation term to obtain the detail component. The interface attenuation term may be appropriately controlled to increase the detail component when the luminance component of the original image exceeds a critical value, and to reduce the detail component when the luminance component of the original image is below the critical value.

The following Equation 17 is an example of the interface attenuation term p(x).

$$p(x) = \log\left(\frac{x_i}{\rho}\right), \tag{17}$$

wherein $x_i$ denotes the luminance component of the original image, and ρ is a constant. The constant ρ may be added to a logarithmic function p(x) such that xi/ρ becomes 0 or more.

By appropriately controlling the constant ρ, a value xi may be determined such that p(x) becomes 1 or more. When p(x) is 1 or less, the magnitude of the detail component may be reduced, while when p(x) is 1 or more, the magnitude of the detail component may be increased.

Finally, the light-quantity adjustment mode operation unit 148 may combine the processed base and detail layers, and generate the luminance component of the second image data. The light-quantity adjustment mode operation unit 148 may combine the base layer and the detail layer based on the following Equation 18:

$$E=s(E1+E2) \tag{18},$$

wherein E denotes a luminance component of second image data, E1 denotes a base layer from which a distortion component is removed, and E2 denotes a detail layer from which a distortion component is removed. Also, s( ) denotes an extended transition function using standard deviation.

The function s( ) may serve to appropriately extend result values of first and second processing units 222 and 224.

For example, if the first processing unit 222 processed the base layer based on Equation 2 and the minimum input luminance ranges from 0 to 255, the minimum value of y becomes '0', and the maximum value of y becomes log '255–log(log 255)'. The value 'log 255–log(log 255)' becomes approximately '2'. That is, the value y may be in a smaller range of 0 to 2. The function s( ) may serve to extend the value y such that the value y may be in the range of 0 to 255 again. The function s( ) may extend the range of the value y using various methods, for example, linearly, exponentially, or logarithmically extend the range of the value y.

Figure 11:
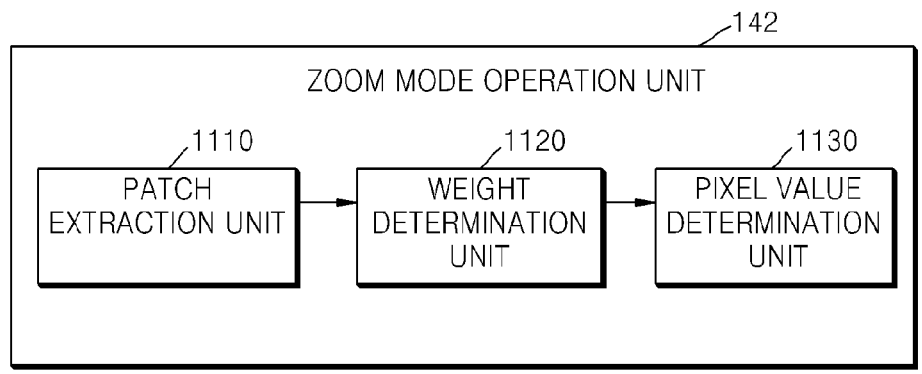
FIG. 11 is a block diagram of a zoom mode operation unit according to an exemplary embodiment.

FIG. 11 is a block diagram of a zoom mode operation unit 142 according to an exemplary embodiment.

The zoom mode operation unit 142 may include a patch extraction unit 1110, a weight determining unit 1120, and a pixel value determining unit 1130.

The patch extraction unit 1110 may extract a first patch, including pixels disposed within a critical range from a target pixel, from first image data. Here, a pixel of first image data corresponding to a pixel of desired second image data is referred to as a target pixel. The patch extraction unit 110 may extract second patches including pixels disposed within critical ranges from pixels that neighbor the target pixel, from the first image data.

The weight determining unit 1120 may determine weights of neighboring pixels based on similarity between the first and second patches.

The pixel value determining unit 1130 may blend pixel values of the neighboring pixels based on the weights of the pixels, and determine a pixel value in second image data corresponding to a target pixel.

Figure 12:
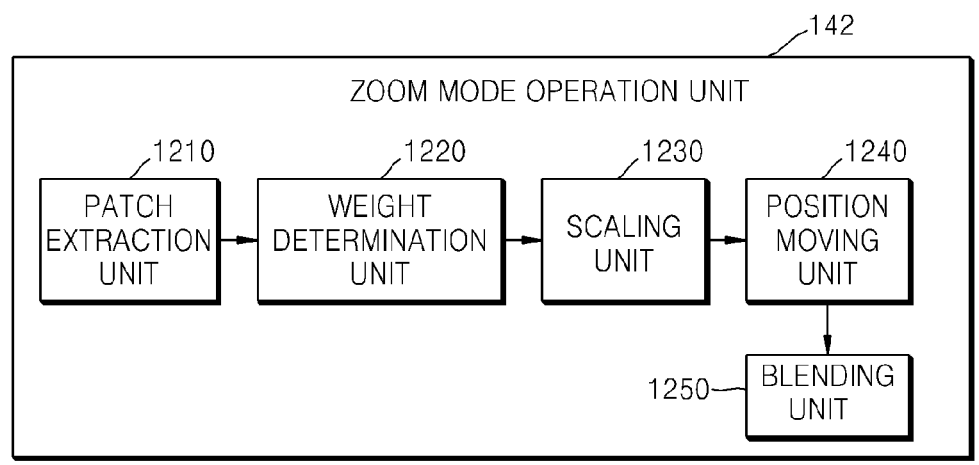
FIG. 12 is a block diagram of a zoom mode operation unit according to another exemplary embodiment.

FIG. 12 is a block diagram of a zoom mode operation unit 142 according to another exemplary embodiment.

The zoom mode operation unit 142 may include a patch extraction unit 1210, a weight determining unit 1220, a scaling unit 1230, a position moving unit 1240, and a blending unit 1250.

The patch extraction unit 1210 may extract a first patch and a second patch from first image data.

The weight determining unit 1220 may determine weights of neighboring pixels based on similarity between first and second patches.

The scaling unit 1230 may scale the first and second patches to a size corresponding to second image data.

The position moving unit 1240 may move the positions of scaled patches.

The blending unit 1250 may blend the moved patches based on the weights of the pixels and generate the second image data.

Figure 13:
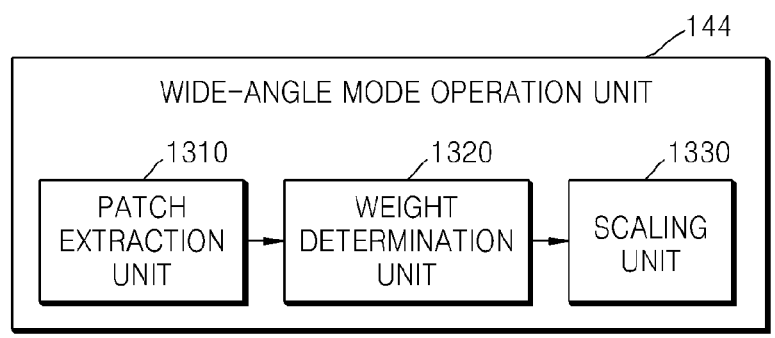
FIG. 13 is a block diagram of a wide-angle mode operation unit according to another exemplary embodiment.

FIG. 13 is a block diagram of a wide-angle mode operation unit 144 according to another exemplary embodiment.

The wide-angle mode operation unit 144 may include a feature extraction unit 1310, a comparison unit 1320, and a generation unit 1330.

The feature extraction unit 1310 may extract features included in at least one first image data.

Figure 14:
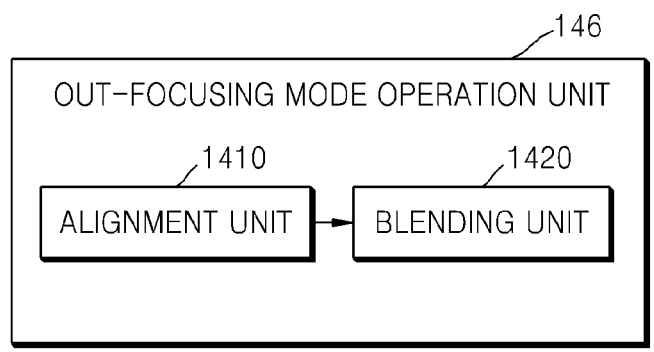
FIG. 14 is a block diagram of an out-focusing mode operation unit according to an exemplary embodiment.

The comparison unit 1320 may compare the features and determine a pair of matched first image data FIG. 14 is a block diagram of an out-focusing mode operation unit 146 according to an exemplary embodiment.

The out-focusing mode operation unit 146 according to an exemplary embodiment may include an alignment unit 1410 and a blending unit 1420.

The alignment unit 1410 may align the at least one first image data based with an object to be focused.

The blending unit 1420 may blend the aligned first image data based on the weight of each of the aligned first image data.

Figure 15:
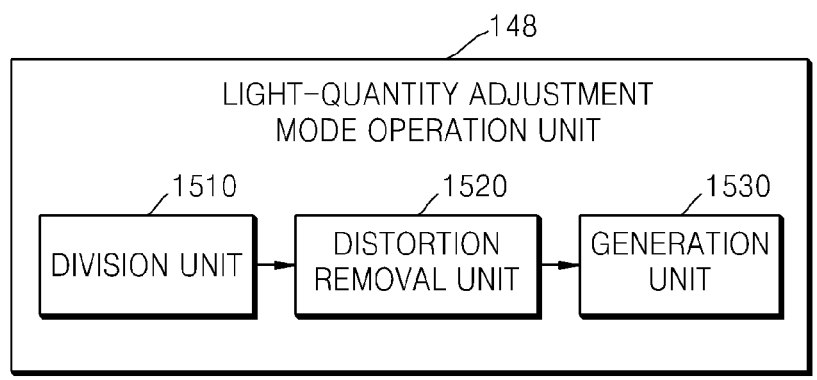
FIG. 15 is a block diagram of a light-quantity adjustment mode operation unit according to an exemplary embodiment.

FIG. 15 is a block diagram of a light-quantity adjustment mode operation unit 148 according to an exemplary embodiment.

The light-quantity adjustment mode operation unit 148 according to an exemplary embodiment may include a division unit 1510, a distortion removal unit 1520, and a generation unit 1530.

The division unit 1510 may divide first image data into a base layer, a detail layer, and a color layer using an interface preservation planarization filter.

The distortion removal unit 1520 may remove an image distortion component from each of the base layer, the detail layer, and the color layer.

The generation unit 1530 may combine the base layer, the detail layer, and the color layer from which the image distortion components are removed, and generate second image data.

Figure 16:
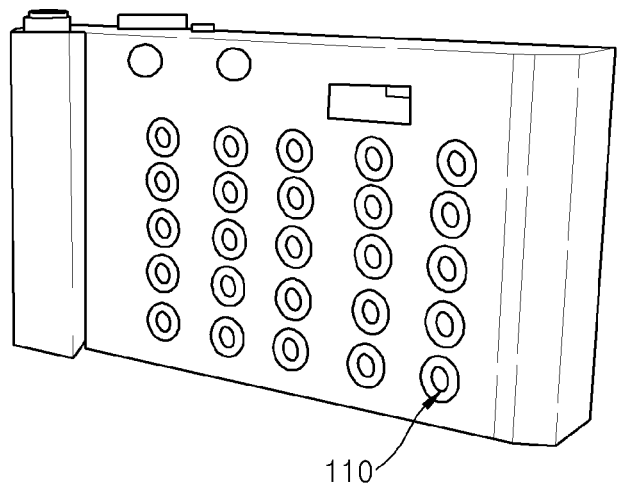
FIG. 16 is a diagram of an image data generation apparatus according to an exemplary embodiment.

FIG. 16 is a diagram of an image data generation apparatus 100 according to an exemplary embodiment.

The image data generation apparatus 100 according to an exemplary embodiment may have a surface to which a plurality of lenses are attached.

Figure 17:
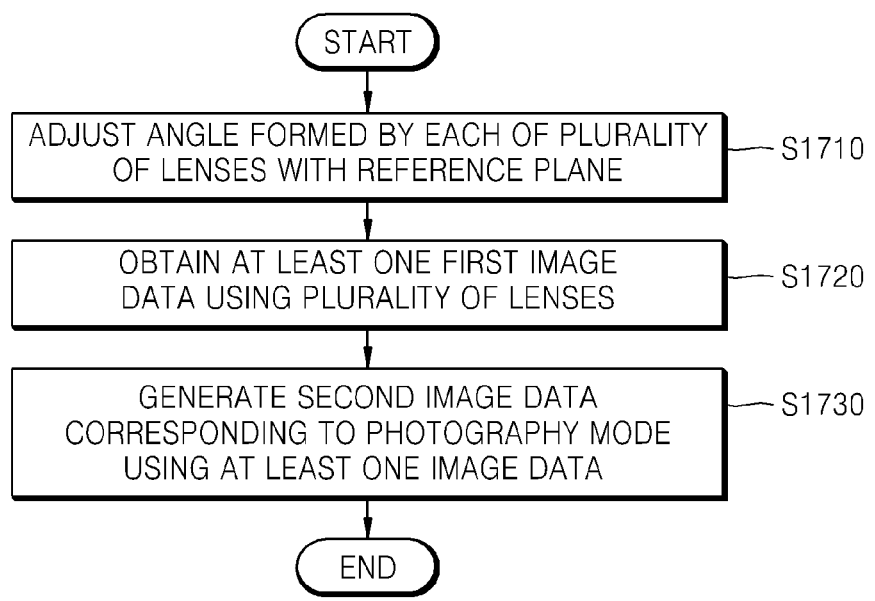
FIG. 17 is a flowchart illustrating a method of generating image data according to an exemplary embodiment.

FIG. 17 is a flowchart illustrating a method of generating image data according to an exemplary embodiment.

In operation S1710, an angle formed by each of a plurality of lenses attached to an imaging device with a reference plane may be adjusted according to a photography mode.

In operation S1720, at least one first image data may be obtained using the plurality of adjusted lenses.

In operation S1730, second mage data corresponding to the photography mode may be generated using the at least one first image data.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs).

While this inventive concept has been particularly shown and described with reference to exemplary embodiments thereof, it will be understood by those skilled in the art that various changes in form and details may be made therein without departing from the spirit and scope as defined by the appended claims. The exemplary embodiments should be considered in descriptive sense only and not for purposes of limitation. Therefore, the scope is defined not by the detailed description of the exemplary embodiments but by the appended claims, and all differences within the scope will be construed as being included.

What is claimed is:

1. A method of generating image data using an imaging device, the method comprising:
adjusting an angle formed by each of a plurality of lenses attached to the imaging device relative to a reference plane based on a photography mode;
obtaining at least one first image data using the plurality of adjusted lenses; and
generating second image data corresponding to the photography mode using the at least one first image data,
wherein each of the plurality of lenses are arrayed on the reference plane, and
wherein the photography mode comprises a zoom mode, in which the angle is adjusted such that at least one of the plurality of lenses is angled towards a central lens disposed in a center of the plurality of lenses,
wherein the generating the second image data comprises extracting a detail component from the first image data, scaling the detail component, and compensating a detail component of the second image data using the scaled detail component of the first image data.

2. The method of claim 1, wherein the generating of the second image data further comprises:
extracting a first patch and a plurality of second patches from the first image data when the photography mode is a zoom mode, the first patch including pixels disposed within a critical range from a target pixel, the second patches including pixels disposed within a critical range from neighboring pixels which neighbor the target pixel;
determining weights of the neighboring pixels based on a similarity between the first patch and the second patches; and
blending pixel values of the neighboring pixels based on the weights to determine a pixel value of the second image data corresponding to the target pixel.

3. The method of claim 1, wherein the generating of the second image data further comprises:
extracting features included in the first image data when the photography mode is a zoom mode;
comparing the features to determine a pair of matched first image data; and
connecting the pair of matched first image data to generate the second image data.

4. The method of claim 1, wherein the generating of the second image data comprises:
aligning the at least one image data based on an object to be focused when the photography mode is an out-focusing mode; and
blending the at least one aligned first image data based on weights of the at least one aligned first image data.

5. An image data generation apparatus comprising:
a lens array including a plurality of lenses attached to a surface of an imaging device;
an angle adjustment unit which adjusts an angle formed by each of the plurality of lenses relative to a reference plane based on a photography mode;
a first obtaining unit which obtains at least one image data using the plurality of adjusted lenses; and
a second obtaining unit which generates second image data corresponding to the photography mode using the at least one first image data,
wherein each of the plurality of lenses are arrayed on the reference plane, and
wherein the photography mode comprises a zoom mode in which the angle is adjusted such that at least one of the plurality of lenses is angled towards a central lens disposed in a center of the plurality of lenses,
wherein a zooming mode operation unit comprises a detail extraction unit which extracts a detail component from the first image data, a scaling unit which scales the detail component,
and a compensation unit which compensates a detail component of the second image data using the scaled detail component.

6. The apparatus of claim 5, wherein the second obtaining unit includes at least one selected from the group consisting of a zoom mode operation unit which generates the second image data having a zooming effect, a wide-angle mode operation unit which generates the second image data having a wide-angle effect, an out-focusing mode operation unit which generates out-focused second image data, and a light-quantity adjustment mode operation unit which generates the second image data of which light quantity is adjusted.

7. The apparatus of claim 6, wherein the zooming mode operation unit further comprises:
- a patch extraction unit which extracts a first patch and a plurality of second patches from the first image data, the first patch including pixels disposed within a critical range from a target pixel, the second pixels including pixels disposed within a critical range from neighboring pixels which neighbors the target pixel;
- a weight determining unit which determines weights of the neighboring pixels based on similarity between the first patch and the second patches; and
- a pixel value determining unit which blends pixel values of the neighboring pixels according to the weights and determines a corresponding pixel value of the second image data corresponding to the target pixel.

8. The apparatus of claim 6, wherein the wide-angle mode operation unit comprises:
- a feature extraction unit which extracts features included in the at least one first image data;
- a comparison unit which compares the features and determines a pair of matched first image data; and
- a generation unit which connects the pair of matched first image data and generates the second image data.

9. A non-transitory computer-readable medium having embodied thereon a computer program which executes a method of generating image data using an imaging device, the method comprising:
- adjusting an angle formed by each of a plurality of lenses attached to the imaging device relative to a reference plane based on a photography mode;
- obtaining at least one first image data using the plurality of adjusted lenses; and
- generating second image data corresponding to the photography mode using the at least one first image data, wherein each of the plurality of lenses are arrayed on the reference plane, and wherein the photography mode comprises a zoom mode in which the angle is adjusted such that at least one of the plurality of lenses is angled towards a central lens disposed in a center of the plurality of lenses, wherein the generating the second image data comprises extracting a detail component from the first image data, scaling the detail component, and compensating a detail component of the second image data using the scaled detail component of the first image data.

10. A method of generating image data using an imaging device having a plurality of lenses, the method comprising:
- determining a photography mode at which the imaging device is set;
- adjusting an angle formed by each of the lenses relative to a reference plane based on a photography mode;
- obtaining first image data using the plurality of adjusted lenses; and
- generating second image data which corresponds to the photography mode using the first image data, wherein each of the plurality of lenses are arrayed on the reference plane, and wherein the photography mode comprises a zoom mode in which the angle is adjusted such that at least one of the plurality of lenses is angled towards a central lens disposed in a center of the plurality of lenses, wherein the generating the second image data comprises extracting a detail component from the first image data, scaling the detail component, and compensating a detail component of the second image data using the scaled detail component of the first image data.

* * * * *